United States Patent
Park et al.

(10) Patent No.: US 10,432,367 B2
(45) Date of Patent: Oct. 1, 2019

(54) LINK ADAPTATION METHOD IN WIRELESS COMMUNICATION SYSTEM EMPLOYING INTER-CELL INTERFERENCE RANDOMIZATION TECHNIQUE

(71) Applicant: LG Electronics Inc., Seoul (KR)

(72) Inventors: Kungmin Park, Seoul (KR); Heejeong Cho, Seoul (KR); Hyunsoo Ko, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 15/553,029

(22) PCT Filed: Feb. 23, 2015

(86) PCT No.: PCT/KR2015/001686
§ 371 (c)(1),
(2) Date: Aug. 23, 2017

(87) PCT Pub. No.: WO2016/137020
PCT Pub. Date: Sep. 1, 2016

(65) Prior Publication Data
US 2018/0034602 A1    Feb. 1, 2018

(51) Int. Cl.
*H04L 5/00*    (2006.01)
*H04B 15/02*    (2006.01)
(Continued)

(52) U.S. Cl.
CPC ........... *H04L 5/0032* (2013.01); *H04B 15/02* (2013.01); *H04B 17/318* (2015.01);
(Continued)

(58) Field of Classification Search
CPC ... H04L 5/0032; H04L 1/0003; H04L 1/0041; H04J 11/005; H04W 24/02; H04W 24/00;
(Continued)

(56) References Cited

U.S. PATENT DOCUMENTS

| 2011/0211618 | A1  | 9/2011 | Oyman et al. |
| 2013/0148528 | A1* | 6/2013 | Ko .................. H04W 24/02 370/252 |

(Continued)

FOREIGN PATENT DOCUMENTS

| KR | 1020080064756 | 7/2008 |
| KR | 1020100117522 | 11/2010 |
| KR | 1020140090351 | 7/2014 |
| WO | 2013025943 A1 | 2/2013 |

OTHER PUBLICATIONS

LG Electronics, "Interleaver Design for CCE-to-RE Mapping," R1-073483, 3GPP TSG-RAN WG1 Meeting #50, Athens, Greece, Aug. 16, 2007, see page 2.

(Continued)

*Primary Examiner* — Walli Z Butt
(74) *Attorney, Agent, or Firm* — Dentons US LLP

(57) ABSTRACT

A disclosure of the present specification provides a method for performing link adaptation by a serving cell which performs interference randomization for inter-cell interference control. The method may comprise the steps of: acquiring interference information on at least one coordination cell to which interference coordination is to be applied among neighbor cells; and performing link adaptation on the basis of the interference information, wherein the interference information includes information on a modulation level, which indicates a modulation scheme for the coordination cell.

14 Claims, 6 Drawing Sheets

(51) Int. Cl.
  *H04W 16/24* (2009.01)
  *H04W 24/00* (2009.01)
  *H04B 17/345* (2015.01)
  *H04B 17/318* (2015.01)
  *H04W 24/02* (2009.01)
  *H04J 11/00* (2006.01)
  *H04L 1/00* (2006.01)

(52) U.S. Cl.
  CPC .......... *H04B 17/345* (2015.01); *H04J 11/005* (2013.01); *H04L 1/0003* (2013.01); *H04W 16/24* (2013.01); *H04W 24/00* (2013.01); *H04W 24/02* (2013.01); *H04L 1/0041* (2013.01)

(58) Field of Classification Search
  CPC ..... H04W 16/24; H04B 17/318; H04B 15/02; H04B 17/345
  See application file for complete search history.

(56) References Cited

U.S. PATENT DOCUMENTS

| | | | |
|---|---|---|---|
| 2014/0213271 A1* | 7/2014 | Lee | H04L 5/0032 455/452.1 |
| 2015/0358982 A1* | 12/2015 | Jeon | H04J 11/005 370/252 |
| 2016/0088573 A1* | 3/2016 | Xue | H04W 52/243 370/252 |
| 2018/0007570 A1* | 1/2018 | Byun | H04B 17/24 |

OTHER PUBLICATIONS

Interdigital Communications, LLC., "Discussion on Enhanced Downlink Control Channel Design," R1-113223, 3GPP TSG-RAN WG1 Meeting #66bis, Zhuhai, China, Oct. 4, 2011, see pp. 1-2.

* cited by examiner

LINK ADAPTATION METHOD IN WIRELESS COMMUNICATION SYSTEM EMPLOYING INTER-CELL INTERFERENCE RANDOMIZATION TECHNIQUE

CROSS-REFERENCE TO RELATED APPLICATIONS

This application is the National Stage filing under 35 U.S.C. 371 of International Application No. PCT/KR2015/001686, filed on Feb. 23, 2015, the contents of which are all hereby incorporated by reference herein in their entirety.

BACKGROUND OF THE INVENTION

Field of the Invention

The present invention relates to mobile communication.

Related Art

Performance of a system may be significantly changed depending on a location of a terminal in a cell in a cellular network system. In particular, inter-cell interference may significantly degrade the performance of the terminal positioned on a cell boundary. Further, as frequency reuse efficiency increases, a higher data rate may be obtained at a cell center, but the inter-cell interference becomes worse. Therefore, on the cell boundary, there is large interference from an adjacent cell, and as a result, a signal to interference plus noise ratio (SINR) may be more severely degraded.

In order to cope with the inter-cell interference, a technique for avoiding the inter-cell interference, a technique for averaging an influence of the inter-cell interference, a technique for removing the inter-cell interference, and the like are researched.

Meanwhile, in recent years, an environment in which a plurality of small-scaled cells or small cells is constructed or an environment in which a plurality of small cells and macro cells are mixed is considered and it is expected that the inter-cell interference will become even larger according to the consideration.

Moreover, it is expected that in a next communication system (for example, a fifth generation communication system), the small cells are arranged more densely. In such an environment, in the existing method of removing or avoiding the interference based on accurate information on the interference will become useless. Therefore, although an interference randomization technique that overcomes the interference based on approximate information on the interference may be useful, the interference randomization technique may not accurately predict an interference control gain by applying the technique, and as a result, there is a disadvantage in that it is difficult to the interference control gain to an actual gain.

SUMMARY OF THE INVENTION

Accordingly, the disclosure of the present specification has been made in an effort to solve the problem.

In an aspect, a method for performing link adaptation is provided. The method may be performed by a serving cell which performs interference randomization for inter-cell interference control. The method may include: determining at least one coordination cell to which interference coordination is to be applied among neighbor cells; acquiring information on a modulation level representing a modulation scheme of the determined coordination cell; and performing link adaptation on the basis of the information on the modulation level.

Further, the method may further include acquiring information on a downlink traffic load for the coordination cell and information on signal reception power of a downlink signal for the coordination cell and the link adaptation may be performed on the basis of the information on the modulation level, the information on the traffic load, and the information on the signal reception power.

In another aspect, a method for performing link adaptation is provided. The method may be performed by a serving cell which performs interference randomization for inter-cell interference control. The method may include: acquiring interference information for at least one coordination cell to which interference coordination is to be applied among neighbor cells and performing link adaptation based on the interference information and the interference information may include information on a modulation level representing a modulation scheme of the neighbor cell.

The neighbor cells may include a $1^{st}$ neighbor cell adjacent to the serving cell and a $2^{nd}$ neighbor cell adjacent to the $1^{st}$ neighbor cell, and the acquiring of the information on the modulation level may include generating a cell list for the coordination cell, and acquiring the information on the modulation level on the basis of the cell list for the coordination cell.

Further, the generating of the cell list for the coordination cell may include requesting the cell list for the $2^{nd}$ neighbor cell to the $1^{st}$ neighbor cell, acquiring the cell list for the $2^{nd}$ neighbor cell from the $1^{st}$ neighbor cell, and generating the cell list for the coordination cell based on the cell list for the $2^{nd}$ neighbor cell.

In addition, the interference information may further include information on a downlink traffic load for the coordination cell and information on signal reception power of a downlink signal for the coordination cell and the acquiring of the interference information may include requesting the information on the traffic load and the information on the modulation level to the $1^{st}$ neighbor cell and acquiring the requested information and requesting the information on the signal reception power to terminals activated by the serving cell and acquiring the requested information.

The downlink signal may be a reference signal transmitted by the neighbor cell.

In this case, the information on the signal reception power may include a measurement result for the signal reception power of the reference signal, and the requesting and acquiring of the information on the signal reception power may include transmitting information on at least one of a location of a resource element corresponding to the reference signal, a reference-signal sequence, and a transmission period of the reference signal to the active terminal and receiving a report regarding the measurement result of the signal reception power of the reference signal from the active terminal.

The active terminal may skip the report of the measurement result of the reference signal of a specific cell or report that an influence of interference is small to the serving cell when it is determined that it is impossible to measure the signal reception power for the reference signal of the specific cell among the coordination cells or the influence of the interference by the specific cell is small.

The modulation level may have a value which increases as a modulation order increases and the information on the modulation level may include information related with at least one of the average modulation level and the minimum modulation level for each of one or more coordination cells.

The information on the modulation level or interference may be a value applied/measured with respect to the full downlink band of each coordination cell, a value applied/measured with respect to each of a plurality of subbands, or a value applied/measured with respect to only a specific subband. Further, the information on the modulation level and the information on the interference may be values applied/measured with respect to different subbands. For example, the information on the interference may be measured in the specific subband and the information on the modulation level may be information on the modulation level applied to a full band.

The serving cell and each of one or more coordination cells configure the modulation level limited interval in which the modulation level needs to be equal to or higher than a reference modulation level and the reference modulation level may be the average modulation level or the minimum modulation level corresponding to the serving cell and each of one or more coordination cells. Further, the reference modulation level may be defined differently for each cell or designated as a cell common value through inter-cell agreement.

Further, the serving cell and each of one or more coordination cells may define a protection space in which it is difficult to maintain a high SINR and modulation level limitation of other cells is thus required and notify the protection space to the other cells.

When the serving cell defines the protection space and notifies the defined protection space to other cells (coordination cells), the other cells may configure the protection space as a modulation level limited zone that limits the modulation level in downlink transmission thereof and share the configured protection space with other cells or when the serving cell defines the protection space and notifies the defined protection space to another cell, the serving cell may request another cell to configure the modulated level limited zone including a part/the entirety of the protection space.

Meanwhile, the interference information may be periodically updated at a first period and at least one of the modulation level limited interval and the protection space may be periodically updated at a second period and the second period may be larger than the first period.

In yet another aspect, a base station for performing interference randomization for inter-cell interference control and performing link adaptation by applying the interference randomization is provided. The base station may include: an RF unit acquiring interference information for at least one coordination cell to which interference coordination is to be applied among neighbor cells and a processor performing link adaptation based on the interference information and the interference information may include information on a modulation level representing a modulation scheme of the neighbor cell.

Herein, the neighbor cells may include a $1^{st}$ neighbor cell directly adjacent to the base station and a high order neighbor cell adjacent to an outer direction of the $1^{st}$ neighbor cell.

Further, the processor configures a modulation level limited interval in which the modulation level needs to be equal to or higher than a reference modulation level and a protection space in which in which it is difficult to maintain a high SINR and modulation level limitation of the neighbor cells is thus required, and the reference modulation level may be an average modulation level or a minimum modulation level corresponding to the base station.

In addition, the processor may configure the modulation level limited interval by considering the protection space corresponding to the coordination cell.

In still yet another aspect, a terminal fir performing communication with a base station which performs interference randomization for inter-cell interference control and performs link adaptation by applying the interference randomization is provided. The terminal includes: an RF unit acquiring a cell list for at least one coordination cell to which interference coordination is to be applied among neighbor cells from the base station; and a processor measuring signal reception power for a downlink signal transmitted by each of cells included in the cell list and reporting a measurement result for the signal reception power to the base station, and the base station may perform link adaptation on the basis of the measurement result.

According to the disclosure of the present specification, the problem in the related art is solved. In more detail, according to the disclosure of the present specification, when the interference randomization technique is applied in order to control inter-cell interference, link adaptation is performed based on interference information such as a modulation level for an adjacent cell which becomes an interference control target, and as a result, a received SINR increases again and the interference randomization technique is optimized and efficient link adaptation is performed.

DESCRIPTION OF EXEMPLARY EMBODIMENTS

Figure 1:
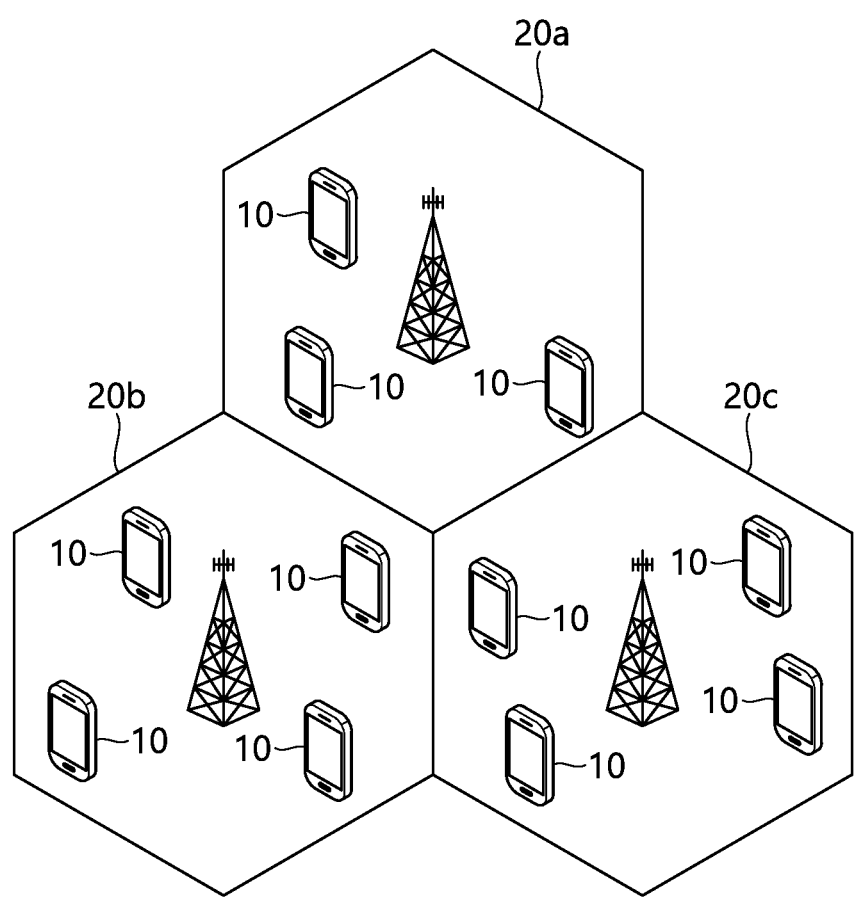
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

<Interference Coordination Technique>

Meanwhile, a next-generation mobile communication system stably supports a high data rate and promotes real-time multi-media supporting regardless of a location of a user.

Therefore, it is anticipated that a method that implements small base stations (small-scaled cells or small cells) densely will be used in order to support the high data rate and support the multi-media in real time with low CAPAX and OPEX.

According to the existing small-scaled cell research, respective terminals are enabled to simultaneously receive signals having strong intensities from two or more base stations by reduction in inter-cell distance and downlink transmissions is controlled 1) so as to allow the terminal to simultaneously receive information from two or more base stations or 2) so as to prevent adjacent base stations from interfering with each other through real-time collaborative communication between neighbor cells.

The cell-to-cell distance or cell density required by the next generation mobile communication may greatly exceed the density considered in the existing small-scaled cell or small-cell research and the number of cells that may interfere with communication of each cell is greatly increased as compared with the existing network.

For example, in the existing small-cell research, the inter-cell interference control is promoted through control information sharing among a maximum of 7 cells and real-time collaborative communication among a maximum of 3 cells, but in the next-generation mobile communication system, it is anticipated that the interference occurs in mutual communication up to a $2^{nd}$ tier cell (control of 18 cells) or higher tier cells, and as a result, a countermeasure for the interference is required.

Herein, a tier cell (neighbor cell or adjacent cell) may mean a cell adjacent to a specific base station or a serving cell.

According to one disclosure of the present specification, the tier cell (neighbor cell or adjacent cell) may be classified according to how the tier cell is adjacent to the specific base station or service cell.

Figure 5:
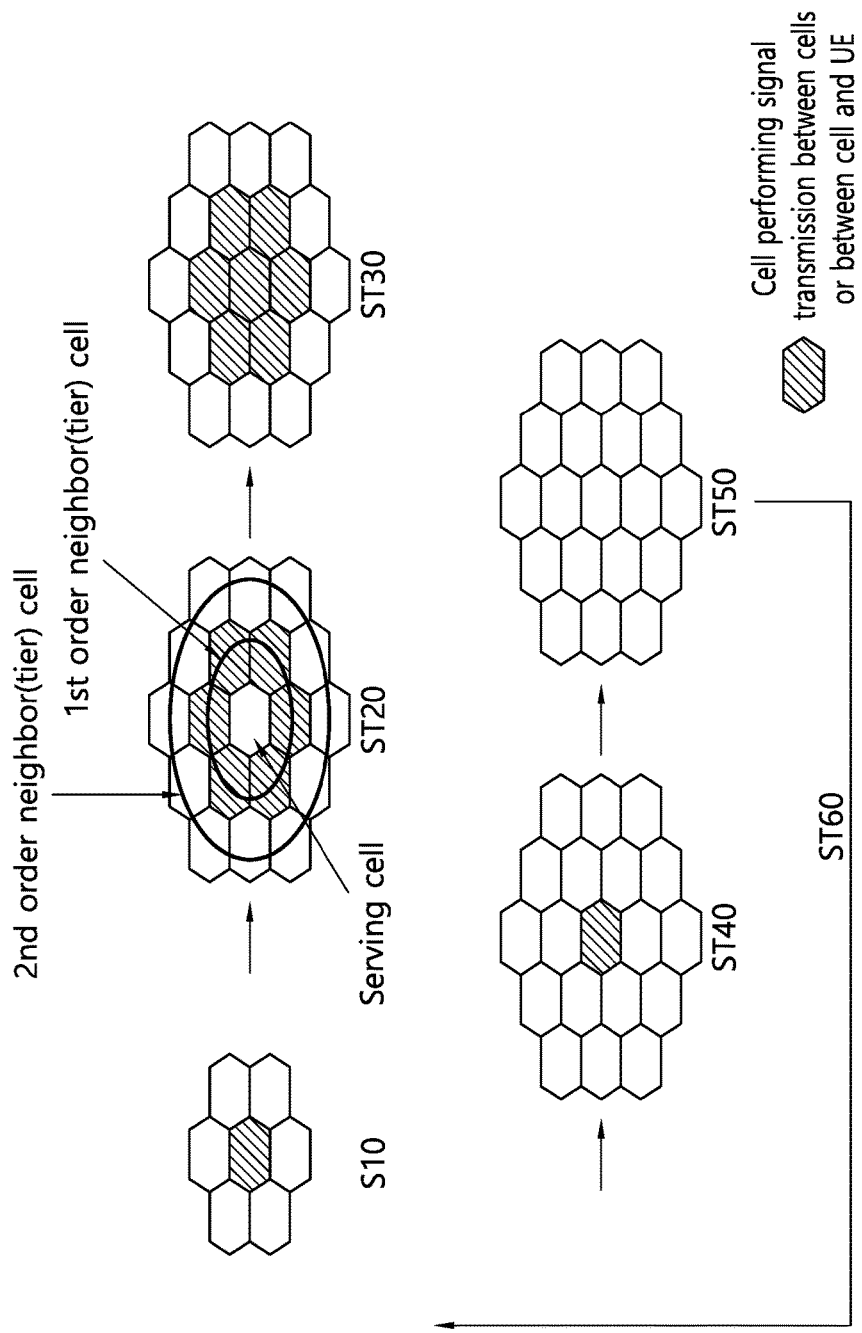
FIG. 5 is an exemplary diagram illustrating a method for acquiring interference information according to the first disclosure of the present specification.

Referring first to FIG. 5, in step ST20, cells (directly) adjacent to the serving cell in an outer direction of the serving cell may be $1^{st}$ order tier cells or $1^{st}$ order neighbor cells.

Further, cells (directly) adjacent to the $1^{st}$ tier cells or $1^{st}$ order tier cells may become $2^{nd}$ order tier cells or $2^{nd}$ order neighbor cells.

Similarly, cells (directly) adjacent to the $2^{nd}$ tier cells or $2^{nd}$ neighbor cells in the outer direction may become $3^{rd}$ tier cells or $3^{rd}$ neighbor cells.

Herein, $2^{nd}$ or higher tier cells or neighbor cells may be referred to as high order tier cells or high order neighbor cells.

Accordingly, the high order tier cell or high order neighbor cell may be indirectly adjacent to the specific base station or serving cell (through the $1^{st}$ tier cell or $1^{st}$ neighbor cell).

Meanwhile, interference coordination technologies are classified as below.

First, a technique for controlling the inter-cell interference may be classified into 1) dynamic coordination and semi-persistent coordination according to signaling overhead and process complexity for supporting the signaling overhead.

Further, the technique for controlling the inter-cell interference may be divided into 1) frequency domain interference division, 2) time domain interference division, and 3) spatial domain interference division according to which domain a radio resource used by each cell is differentiated for communication without the interference.

The spatial domain interference division among the three techniques may be implemented only through inter-cell dynamic coordination and coordinated multi-point (CoMP) of LTE Rel-11 corresponds to the technology.

The frequency domain interference division has an advantage in that the frequency domain interference division may be implemented by a simplest structure and smallest signaling overhead and inter cell interference coordination (ICIC) of LTE Rel-8 corresponds to the frequency domain interference division.

The signaling overhead and design complexity increase as compared with the technologies, but enhanced inter cell interference coordination (eICIC) of LTE Rel-10 to 11 and further enhanced inter cell interference coordination (FeICIC) correspond to the time domain interference division method which is advantageous in supporting multiple-access and configuring a dense hierarchical network.

Meanwhile, when the inter-cell dynamic coordination is supported, a gist of a dense small base station configuration, which intends to maintain CAPEX (inter-cell high performance interference implementation) and COPEX (an increase in energy consumption of the cell and the increase in operation complexities of the terminal and the base station) to be low may not be satisfied.

Accordingly, the dynamic coordination may be performed among the neighbor cells and the inter-cell interference control may be performed through semi-persistent coordination among other cells.

Figure 2:
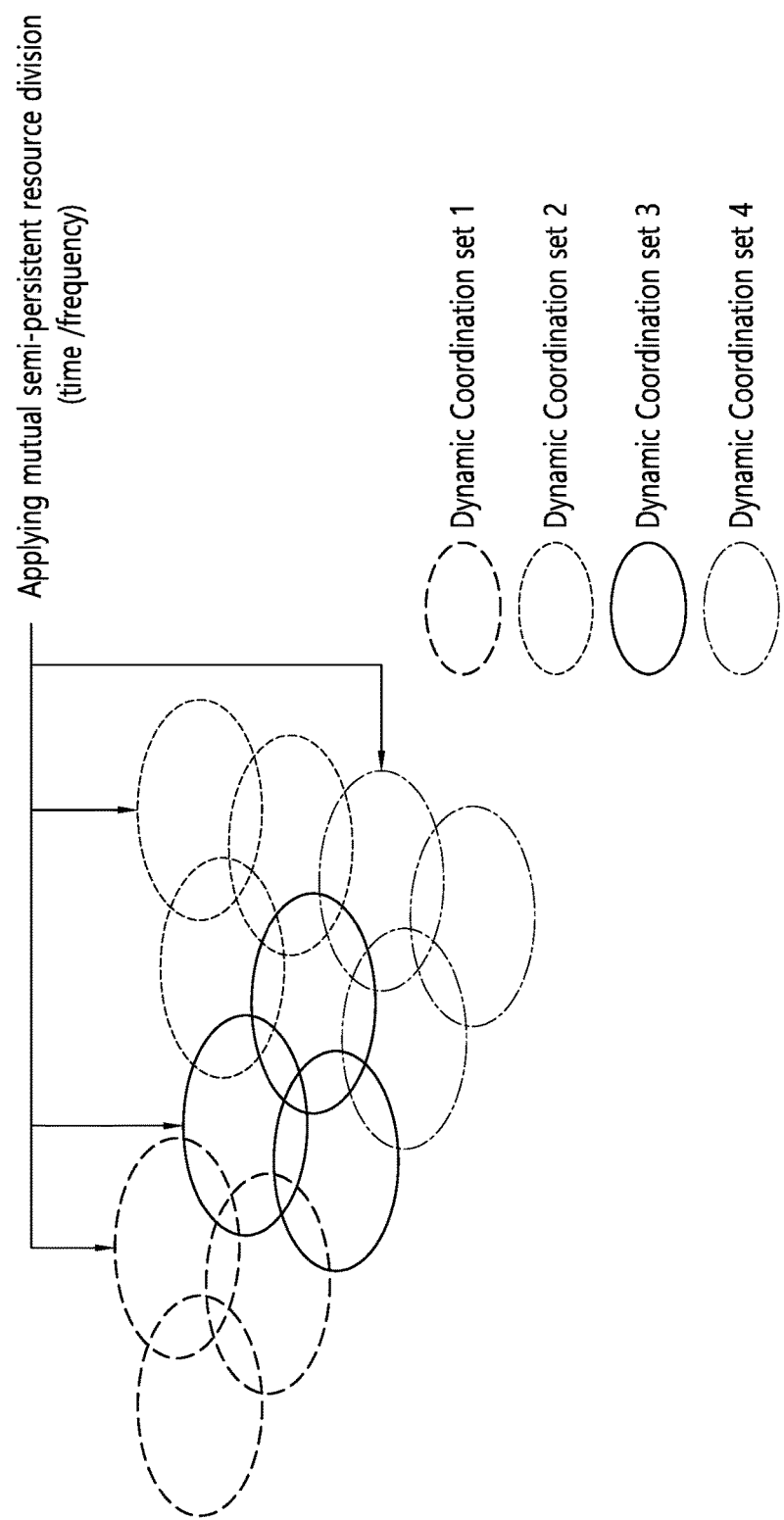
FIG. 2 illustrates an example of inter-cell interference control.

FIG. 2 Illustrates an Example of Inter-Cell Interference Control.

Referring to FIG. 2, as one example of an optimization method which may be implemented through appropriate combinations of the existing techniques, the dynamic coordination may be performed among the neighbor cells (among cells in one set among dynamic coordination sets 1 to 4) and the semi-persistent coordination may be performed among other cells (among cells which belong to dynamic coordination sets are different from each other).

When such a structure is applied, the radio resources usable by each cell are restricted, and area throughput and spectral efficiency will decrease as compared with the case where the dynamic coordination among all cells is supported.

<Interference Randomization Technique>

Meanwhile, the inter-cell interference is controlled without the inter-cell dynamic coordination and the interference randomization (IR) technique may be applied in order to prevent the radio resources used by each cell from being restricted.

The interference randomization technique may serve to transform the interference-cell interference into a Gaussian job which is easy to overcome through cooperation between a transmitter end and a receiver end without dividing inter-cell resources and attenuate the intensity of the interference to some extent.

That is, the interference randomization technique is advantageous in terms of an area capacity because all cells may use a maximum of radio resources.

Accordingly, it is possible to increase the area throughput by a method that replaces the existing persistent cell coordination with the IR or partially mixes the existing persistent cell coordination.

Figure 3:
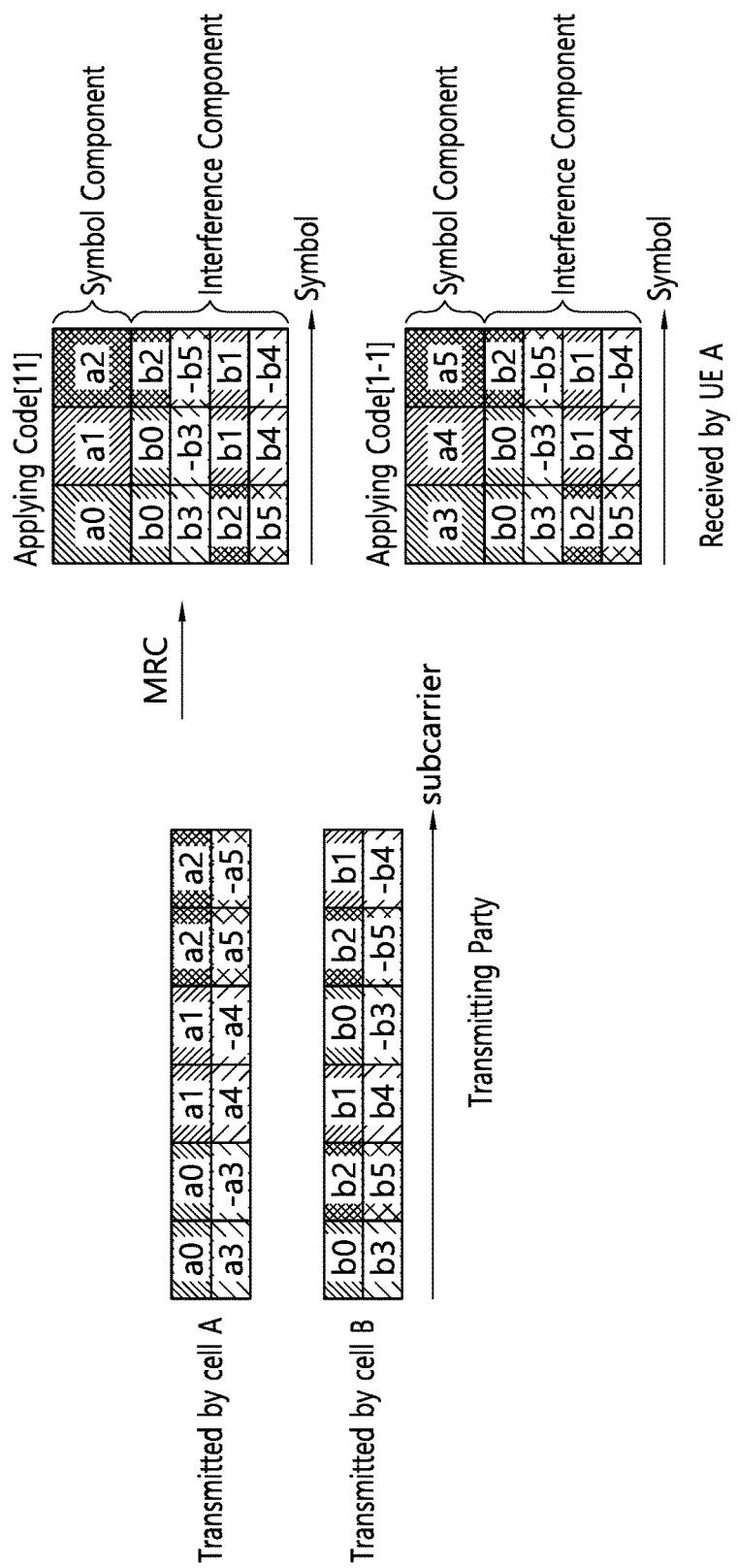
FIG. 3 illustrates one example of an interference randomization technique.

FIG. 3 Illustrates One Example of an Interference Randomization Technique.

Referring to FIG. 3, in the interference randomization technique according to one disclosure of the present specification, each of Cell A and Cell B may transmit one symbol each twice.

However, Cell A transmits symbols a0 to a2 with the same symbol (+) both twice and transmits symbols a3 to a5 with different symbols (+ and −) and Cell B also transmits symbols b0 to b2 with the same symbol (+) both twice and transmits symbols b3 to b5 with different symbols (+ and −) and respective transmission orders may be the same as those illustrated in FIG. 3.

In this case, Terminal A restores the symbols by applying maximum ratio combining (MRC) as illustrated in FIG. 3 in receiving the symbols, and as a result, reception power of other symbols other than a target symbol is randomized to improve reception performance.

<Disclosures of Present Specification>

Meanwhile, in order to connect the increase in area capacity acquired by replacing the existing inter-cell semi-persistent coordination with the interference randomization (IR) to an actual performance gain, efficient link adaptation depending on variation of a signal to interference plus noise ratio (SINR) may be performed.

However, since it may be difficult that each cell anticipates the SINR variation by the variation of the inter-cell interference at the time of applying the interference randomization (IR), the efficient link adaptation may be difficult.

Accordingly, it is necessary to develop and apply a technique that allows a variation width of the inter-cell interference by the interference randomization (IR) to be constant or to be within an anticipation range.

The disclosures of the present specification generally present two methods given below in order to stabilize a received SINR upward and support the link adaptation technique considering the variation of the received SINR.

A first method is a method in which each cell calculates an average interference randomization (IR) gain or the SINR gain and performs link adaptation based on the calculated average interference randomization gain or SINR gain. To this end, each cell shares information on a modulation level that influences the interference randomization gain.

A second method is a method in which each cell defines (alternatively, sets) a modulation level limited subspace in which the modulation level is limited and shares information the modulation level limited subspace (the modulation level is limited) with other cells in order to stabilize the SINR.

Each cell may perform the link adaptation by referring to the information on the modulation level limited subspace corresponding to other cells.

In other words, the modulation level limited subspace may mean a modulation level limited interval in which the modulation level set by each cell needs to be equal to or higher than a reference modulation level.

Herein, the reference modulation level may be an average modulation level or a minimum modulation level corresponding to each cell.

The modulation level may represent a modulation scheme.

Accordingly, the modulation level may be a modulation order (see 3GPP TS 36.211 Release 10) or a corresponding parameter and may be a value which increases as the modulation order increases.

For reference, the value of the modulation order may be 2 with respect to QPSK transmission, 4 with respect to 16 QAM transmission, and 6 with respect to 64 QAM transmission.

Further, the modulation level may be a modulation and coding scheme (see 3GPP TS 36.213 Release 10) level or an MCS index or a parameter corresponding thereto and may be a value which increases as the value of the MCS level or MCS index increases.

Hereinafter, the disclosures of the present specification will be described with reference to drawings.

In detail, a first disclosure among the disclosures of the present specification proposes the method that performs the link adaptation based on the SINR gain and a second disclosure among the disclosures of the present specification proposes a method for configuring the modulation level limited interval in which the modulation level is limited for additional SINR stabilization.

I. First Disclosure of Present Specification

Final SINR variation depending on application of the interference randomization (IR) may occur by four following elements.

1. Signal strength variation of desired signal
2. Interfere changing of interference source
3. Interference strength variation of each interference signal
4. Interference signal-form variation of each interference Among the terms, in Term 1, each cell is enabled to arbitrarily coordinate or timely monitor the signal strength variation and in Terms 2 and 3, it is difficult to control the interferer changing, and consequently, controlling an effect by Term 4 is a method that may increase accuracy of the link adaptation depending on the SINR variation.

In a commercial communication system, a primary element for determining a signal form for each time/radio resource/cell is the modulation level and further, each cell determines the modulation level according to the received SINR anticipated in downlink transmission. That is, the modulation level of the downlink transmission is determined by the inter-cell interference and also influences a size of the inter-cell interference and the first disclosure of the present specification proposes a method that estimates the SINR gain based on modulation level information of the neighbor cell (coordination cell) and performs the link adaptation.

In detail, even though each base station does not determine a downlink transmission status of the neighbor cell, which time-varies, when each base station may know an average transmission aspect, each base station is enabled to acquire approximate information regarding actual interference which influences the downlink transmission thereof at the time of applying adjacent cell interference and interference randomization (IR) based on the average transmission aspect.

In order to acquire the approximate information of the actual interference, each base station or cell may require information on following parameters for the neighbor cells.

1. Downlink transmission frequency (related with a downlink traffic load situation)
2. Average reception power of the signal when the signal is to be received as the interference by the downlink transmission
3. Average modulation level when the signal acts as the interference Herein, the parameters as information for acquiring the appropriate information regarding the actual interference may be referred to as interference information.

After all of the parameters are shared, the gain for the interference randomization may be calculated and the SINR variation width may be calculated only by the information on the average modulation level which is some of the parameters according to a characteristics of the interference randomization technique applied to each cell. Each cell needs to perform operations given below in order to acquire each of the information on the parameter.

1. An operation of notifying information or a situation for a downlink traffic load of each cell
2. An operation of requesting measuring and reporting of signal reception power for the coordination cell to active UEs of each cell Upon the request, the base station may request measurement for a full downlink band or request measurement for a specific band such as the modulation scheme limited band clearly described in the second disclosure of the present invention, or the like, or request reporting measurement of each of multiple subbands.

3. An operation of transferring the average modulation level or minimum modulation level of the downlink transmission of each cell to the coordination cells The information on the modulation level may be information on the full downlink band, information on each of the multiple subbands, or information on a specific subband.

The operations may be performed with different periods or the operations of Terms 1 and 2 among the operations may not be performed and in this case, each cell estimates the SINR variation width based on the modulation level secured by Term 3.

The method for performing the link adaptation according to the first disclosure of the present specification as the method for performing the link adaptation by the serving cell that performs the interference randomization for the inter-cell interference control may include determining at least one coordination cell which becomes an interference coordination target among the neighbor cells, acquiring the information on the modulation level representing the determined modulation scheme of the coordination cell, and performing the link adaptation based on the information on the modulation level.

Further, the method may further include acquiring information on a downlink traffic load for the coordination cell and information on signal reception power of the downlink signal for the coordination cell and the link adaptation may be performed based on the information on the modulation level, the information on the traffic load, and the information on the signal reception power.

In addition, the downlink signal may be a reference signal transmitted by the neighbor cell and the information on the signal reception power may include a measurement result for the signal reception power of the reference signal.

In this case, the acquiring of the information on the signal reception power may include transmitting information on at least one of a location of a resource element corresponding to the reference signal, a reference-signal sequence, and a transmission period of the reference signal to a UE in which the coordination cell is designated as the serving cell and activated and receiving a report regarding the measurement result of the signal reception power of the reference signal from the active UE.

That is, the method for performing the link adaptation according to the first disclosure of the present specification as the link adaptation performing method by the serving cell that performs the interference randomization for the inter-cell interference control may include acquiring, by an interference coordination target among the neighbor cells, the interference information for at least one coordination cell or coordination target cell in order for the serving cell to estimate the SINR gain by the interference randomization and performing the link adaptation based on the interference information.

According to the first disclosure, the interference information may include information on the modulation level representing the modulation scheme of the coordination cell.

Herein, the neighbor cell may include a $1^{st}$ neighbor cell (alternatively, a $1^{st}$ tier cell) adjacent to the serving cell and a $2^{nd}$ neighbor cell (alternatively, a $2^{nd}$ tier cell) adjacent to the $1^4$ neighbor cell.

In detail, the $1^4$ neighbor cell may mean a cell directly adjacent to the serving cell in the outer direction of the serving cell (see FIG. 5).

Further, the $2^{nd}$ neighbor cell as a cell directly adjacent to the $1^4$ neighbor cell in the outer direction may mean a cell indirectly adjacent to the serving cell through the $1^4$ neighbor cell (see FIG. 5).

In addition, the neighbor cell may be a broad concept including a high order neighbor cell (indirectly) adjacent to the serving cell in the outer direction. Herein, the high order neighbor cell may mean a $2^{nd}$ or higher neighbor cell.

Meanwhile, the acquiring of the interference information may include generating a cell list for the coordination cell and acquiring the interference information based on the cell list for the coordination cell.

The coordination cell as a cell that shares related information with the serving cell for the interference control or interference randomization and the serving cell performs the link adaptation based on the interference information for the coordination cell.

In detail, the serving cell may request neighbor cell information to the $1^{st}$ neighbor cell in order to generate (alternatively, learn or acquire) a cell list for the coordination cells.

The neighbor cell information may be information on or the cell list for the neighbor cells adjacent to the serving cell. In this case, the neighbor cell information may be the cell list of the $1^{st}$ neighbor cells and the high order neighbor cells.

Further, the neighbor cell information may be the information on or the cell list of the $1^{st}$ neighbor cells and the $2^{nd}$ neighbor cells when an adjacent boundary which becomes the interference control target is the $2^{nd}$ neighbor cell or the $2^{nd}$ tier cell.

However, on the assumption that the serving cell already knows the information on or the cell list of the $1^{st}$ neighbor cell, the neighbor cell information which means adjacent cells of the $1^{st}$ neighbor cell may mean only the cell list of the $2^{nd}$ neighbor cells or the information on or the list of the high order neighbor cells.

The coordination cell may mean the neighbor cell itself or all of the neighbor cells in the aforementioned cases and mean only cells which have a significant interference degree is severe or which become a particular concern target.

In a latter case, the coordination cell may be determined or selected by considering the interference information related with at least one of a distance from the neighbor cell, the signal strength (e.g., signal reception power) of the downlink signal, the transmission frequency of the downlink signal, the downlink traffic load, the information (e.g., the information on the average modulation level or the minimum modulation level of the corresponding cell) on the modulation level, the interference degree, and the interference frequency.

According to the first disclosure of the present specification, the generating of the cell list of the coordination cells may include requesting the cell list of the $2^{nd}$ neighbor cells to the $1^{st}$ neighbor cell, acquiring the cell list of the $2^{nd}$ neighbor cells to the $1^{st}$ neighbor cell, and generating the cell list of the coordination cells based on the cell list of the $2^{nd}$ neighbor cells.

In detail, the serving cell may generate the cell list of the coordination cells based on the information on or the cell list of the $1^{st}$ neighbor cells which is already known and the acquired cell list of the $2^{nd}$ neighbor cells.

For example, the cell list of the coordination cells may be the cell lists of the $1^{st}$ neighbor cells and the $2^{nd}$ neighbor cells or the list of the cells which have the significant interference degree and become the interference control target among the $1^{st}$ neighbor cells and the $2^{nd}$ neighbor cells.

According to the first disclosure of the present specification, the cell list of the coordination cells may be updated periodically or as necessary.

Accordingly, when the coordination cell list is updated, the interference information may also be updated together.

According to the first disclosure of the present specification, the interference information may include at least one of the information on the downlink traffic load for the coordination cell and the information on the signal reception power of the downlink signal for the coordination cell.

Accordingly, the acquiring of the interference information may include requesting the information on the traffic load and the information on the modulation level to the $1^{st}$ neighbor cell and acquiring the requested information and requesting the information on the signal reception power to the UEs activated by the serving cell and acquiring the requested information.

In detail, the downlink signal may be the reference signal transmitted by the neighbor cell.

In this case, the information on the signal reception power may include the measurement result for the signal reception power of the reference signal.

Accordingly, the acquiring of the information on the signal reception power may include transmitting information on at least one of the location of the resource element corresponding to the reference signal, the reference-signal sequence, and the transmission period of the reference signal to the active UE and receiving the report regarding the measurement result of the signal reception power of the reference signal from the active UE.

The active UE may generate the measurement result by measuring the signal reception power of the reference signal based on the location of the resource element corresponding to the transmitted reference signal, the reference-signal sequence, or the transmission period of the reference signal.

Further, the active UE may skip the report of the measurement result of the reference signal of the specific cell or report that the influence of the interference is small to the serving cell when it is determined that it is impossible to measure the signal reception power for the reference signal of a specific cell among the coordination cells or the influence of the interference by the specific cell is small.

Figure 4:
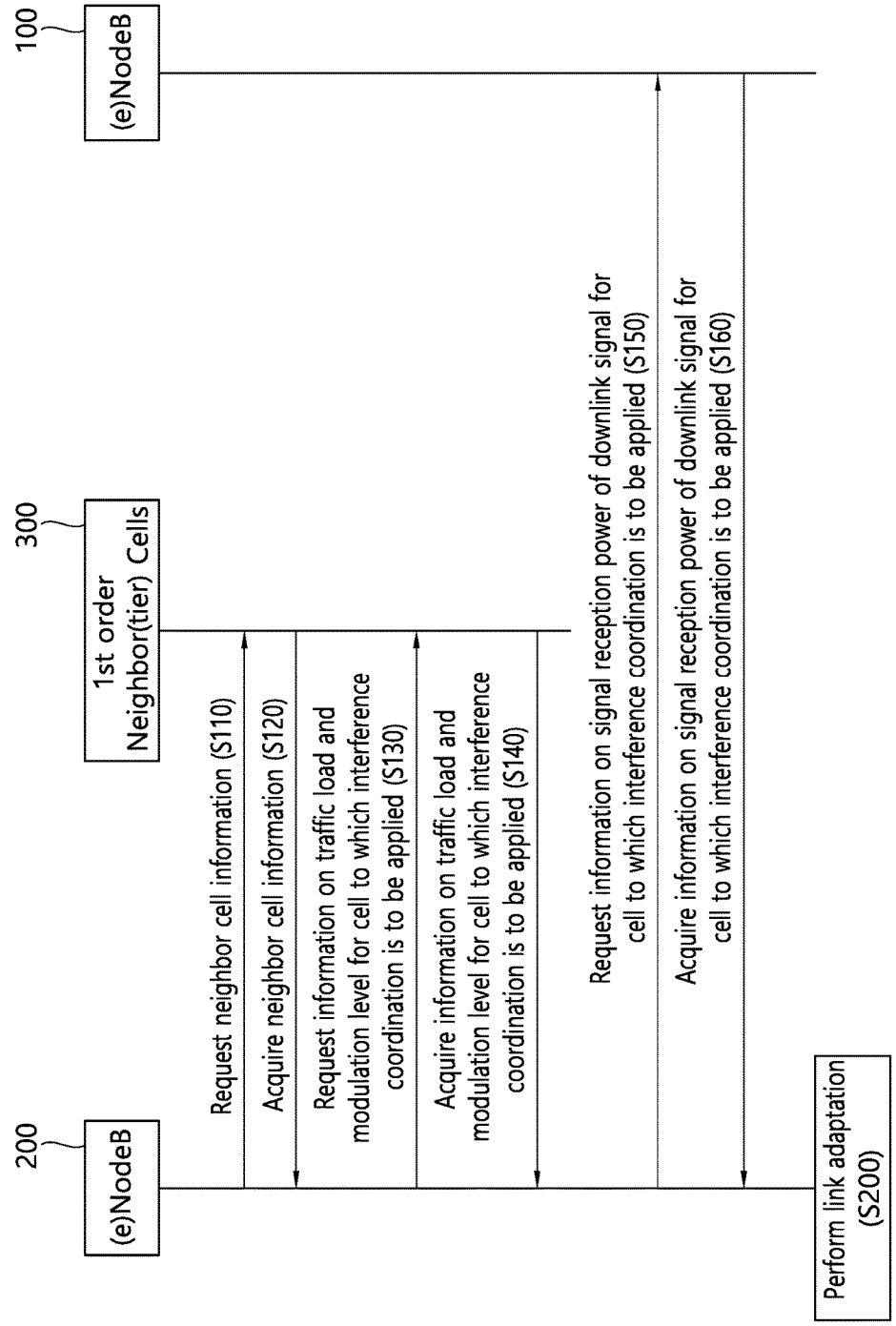
FIG. 4 is an exemplary diagram illustrating a method for performing link adaptation according to a first disclosure of the present specification.

The method for performing the link adaptation according to the first disclosure of the present specification is summarized in FIG. 4.

FIG. 4 is an Exemplary Diagram Illustrating a Method for Performing Link Adaptation According to a First Disclosure of the Present Specification.

Referring to FIG. 4, the method for performing link adaptation according to the first disclosure of the present specification may be performed in the following order.

First, a specific base station ((e)NodeB) 200 or serving cell may request neighbor cell information to a $1^{st}$ order neighbor cell or $1^{st}$ order tier cell (S110).

As one example, the neighbor cell information may be information on or a cell list for a $2^{nd}$ order neighbor cell or $2^{nd}$ order tier cell adjacent to the $1^{st}$ order neighbor cell in an outer direction.

Next, the base station 200 may obtain the neighbor cell information from the $1^{st}$ neighbor cell (S120).

Next, the base station 200 may request to the $1^{st}$ neighbor cell information on a traffic load and a modulation level for an interference coordination target cell, a coordination target cell, or a coordination cell based on the neighbor cell information (S130).

Next, the base station 200 may obtain the information on the traffic load and the modulation level from the $1^{st}$ neighbor cell (S140).

Next, the base station 200 may request information on signal reception power of a downlink signal for the interference coordination target cell to an active UE thereof (S150).

Next, the base station 200 may obtain the information on the signal reception power of the downlink signal from the active UE thereof (S160).

Next, the base station 200 may perform the link adaptation based on the traffic load, the modulation level, and the information on the signal reception power of the downlink signal (S200).

FIG. 5 is an Exemplary Diagram Illustrating a Method for Acquiring Interference Information According to the First Disclosure of the Present Specification.

Referring to FIG. 5, the serving cell 200 or base station may request neighbor cell information or a neighbor cell list to $1^{st}$ order neighbor cell (ST10).

Herein, the neighbor cell information or neighbor cell list may include the cell list for the $2^{nd}$ order neighbor cell adjacent to the $1^{st}$ neighbor cell in the outer direction.

As necessary, the neighbor cell list may further include a cell list for $3^{rd}$ or higher neighbor cells.

Next, the $1^{st}$ neighbor cell may transmit the neighbor cell list to the serving cell 200 (ST20).

Next, the serving cell 200 may request to the $1^{st}$ neighbor cell the information on the modulation level and the downlink traffic load for the coordination cell which becomes an interference coordination or control target based on the neighbor cell list and acquire the requested information (ST30).

Next, the serving cell 200 may request the information on the signal reception power or signal reception strength of the downlink signal for the coordination cell to active UEs thereof (ST40).

Herein the coordination cell may include both of the $1^{st}$ neighbor cells and the $2^{nd}$ neighbor cells (alternatively, high order neighbor cells) adjacent to the serving cell 200 or include only cells in which the traffic load is determined to be large.

That is, the serving cell 200 may request the active UEs to determine the signal reception power or signal reception strength for all neighbor cells adjacent to the serving cell 200 or in particular, request the active UEs to determine the signal reception power or signal reception strength for only the cells in which the traffic load is determined to be large.

In such a method, the neighbor cell list may be generated, the neighbor cell list may be updated with a specific period, and the interference information including the information the modulation level, the downlink traffic load, and the signal reception power of the downlink signal may also be updated together (ST50).

When the cell list for the neighbor cell or coordination cell is reset, steps ST10 to ST50 may be performed again (ST60).

Meanwhile, according to the first disclosure of the present specification, the serving cell 200 or base station may estimate the average modulation levels of the coordination target cell and the serving cell 200 or base station and serving cell 200 and the coordination target cells may share the average modulation levels thereof (estimating and sharing the average value of the modulation level).

In estimating the average modulation level, there may be two schemes including 1) a scheme considering the modulation level in transmitting all downlink data and 2) a scheme considering only a large packet modulation level of a large packet which acts as actual interference.

In the case of 2) (when only the large packet modulation level is considered), information on a weight occupied by large packet transmission among the information is shared with the coordination cell in addition to the information on the downlink traffic, and as a result, another cell may secure more precise interference information.

As another example, each cell may notify not the modulation level but the minimum modulation level to other cells.

Further, in detecting and reporting the reception signal power for a high order neighbor cell or high order tier cell, since there is a high possibility that the signal of the high order tier cell will be received by the UE with low reception power, there is a possibility that the UE will not be able to detect the signal by the existing neighbor cell detection method.

Accordingly, the following schemes may be provided with respect to the following high order tier cell.

That is, 1) the base station may perform an operation of transferring the transmission period of the measurement reference signal so that the UE detects the measurement reference signal of the corresponding cell by receiving the measurement reference signal of the corresponding cell multiple times and thereafter, combining the measurement reference signals in addition to transferring a cell ID of the corresponding cell or the location of the resource and the reference sequence information used for transmitting the measurement reference signal according to the existing method when requesting the UE to detect the reception power of the high order tier cell and 2) the UE may skip the report of the measurement result or report that excessively low reception power is meaningless due to the interference when determining that the reception power of the measurement reference signal is excessively low, and as a result, it is impossible to measure the reception power or a possibility that the excessively low reception power will act as the interference is low to the base station or serving cell 200.

When described in detail, the downlink signal may be the reference signal transmitted by the neighbor cell and the information on the signal reception power may include the measurement result for the signal reception power of the reference signal.

Accordingly, the acquiring of the information on the signal reception power may include transmitting information on at least one of the location of the resource element corresponding to the reference signal, the reference-signal sequence, and the transmission period of the reference signal to the active UE and receiving the report regarding the measurement result of the signal reception power of the reference signal from the active UE.

In this case, the active UE may skip the report of the measurement result of the reference signal of the specific cell or report that the influence of the interference is small to the serving cell when it is determined that it is impossible to measure the signal reception power for the reference signal of a specific cell among the coordination cells or the influence of the interference by the specific cell is small.

Meanwhile, when the serving cell or base station requests the UE to detect the high order cell (detect the neighbor cell), the serving cell or base station may 1) transfer the request to a specific UE in a format of control information, or 2) notifies the request to all active UEs in a broadcasting format, or 3) request the UE to perform periodic reporting.

In this case, information on a measurement period may be transferred in a system information format.

Further, information on a measurement target is enabled to be transferred simultaneously with the measurement request or transferred in another time slot.

For example, the base station may transfer the information on the measurement target to the active UE through a dedicated channel in advance and integrally request measurement for the coordination target cell to be performed and reported through broadcasting as necessary.

II. Second Disclosure of Present Specification

Meanwhile, even in a situation in which an average modulation level of each cell is known, when a modulation level of a neighbor cell varies severely, for example, when all cells apply a low modulation level at a time, each cell may undergo a difficulty in link adaptation due to larger interference than expected.

Accordingly the second disclosure of the present specification proposes a method for configuring a modulation level limited interval in which the modulation level is limited for additional SINR stabilization.

Each cell needs to select and operate the modulation level limited interval in which the modulation level is limited at the time of using a specific space (space, time/frequency radio resource).

The modulation level limited interval is periodically repeated and a period and a frequency of the modulation level limited interval may be selected differently for each cell.

The modulation level in the modulation level limited interval may be limited to the average modulation level reported by each cell or higher or limited to a minimum modulation level collaborated among coordination cells or higher.

The modulation level limited interval may be independently selected by each cell, but information on the modulation level limited interval may be shared by the coordination cells.

In this case, 1) each cell may request the coordination cells to change the period/frequency of the interval and 2) each cell defines a protection space thereof and notifies the defined protection space to the coordination cells to request the coordination cells to preferentially consider the protection space thereof when defining the interval.

The protection space is a space in which it is difficult to maintain a high SINR without a stable interference randomization (IR) gain and each cell may allocate multiple protection spaces.

Further the protection space may be a subband, a time slot, or information on the subband and the time slot.

The method for performing the link adaptation according to the second disclosure of the present specification as the method for performing the link adaptation by the serving cell that performs the interference randomization for the inter-cell interference control may include determining at least one coordination cell which becomes an interference coordination target among the neighbor cells, acquiring the information on the modulation level representing the determined modulation scheme of the coordination cell, and performing the link adaptation based on the information on the modulation level.

The method for performing the link adaptation according to the second disclosure of the present specification as the method for performing the link adaptation by the serving cell that performs the interference randomization for the inter-cell interference control may include acquiring interference information for at least one coordination cell which becomes an interference coordination target among the neighbor cells and performing the link adaptation based on the interference information.

The interference information may include information on the modulation level.

Herein, the modulation level has a value which increases as a modulation order increases and the information on the modulation level may include information related with at least one of the average modulation level and the minimum modulation level for each of one or more coordination cells.

The information on the modulation level or interference may be a value applied/measured with respect to the full downlink band of each coordination cell, a value applied/measured with respect to each of a plurality of subbands, or a value applied/measured with respect to only a specific subband. Further, the information on the modulation level and the information on the interference may be values applied/measured with respect to different subbands. For example, the information on the interference may be measured in the specific subband and the information on the modulation level may be information on the modulation level applied to a full band.

In this case, the serving cell and each of one or more coordination cells configure the modulation level limited interval in which the modulation level needs to be equal to or higher than a reference modulation level and the reference modulation level may be the average modulation level or the minimum modulation level corresponding to the serving cell and each of one or more coordination cells. Further, the reference modulation level may be defined differently for each cell or designated as a cell common value through inter-cell agreement.

Herein, the modulation level limited interval may be notified to other cells.

Therefore, the serving cell may know the modulation level limited intervals for the neighbor cells and perform the link adaptation by referring to the modulation level limited intervals for the neighbor cells.

Further, the serving cell and each of one or more coordination cells may define the protection space in which it is difficult to maintain the high SINR and modulation level limitation of other cells is thus required and notify the protection space to the other cells.

Therefore, the serving cell may know the protection spaces for the neighbor cells and perform the link adaptation by referring to the protection spaces for the neighbor cells.

Further, each of the cells may request other cells to preferably consider the protection space thereof at the time of configuring the modulation level limited interval.

Accordingly, the serving cell may configure the modulation level limited interval thereof by considering the protection spaces of other cells at the time of configuring the modulation level limited interval thereof.

Further, the neighbor cell or coordination cells may configure the modulation level limited intervals thereof by considering the protection space of the serving cell at the time of configuring the modulation level limited intervals thereof.

When the serving cell defines the protection space and notifies the defined protection space to other cells (coordination cells), the other cells may configure the protection space as the modulation level limited interval that limits the modulation level in downlink transmission thereof and share the configured protection space with other cells or when the serving cell defines the protection space and notifies the defined protection space to another cell, the serving cell may request another cell to configure the modulated level limited interval including a part/the entirety of the protection space.

According to the second disclosure of the present specification, the interference information (e.g., the information on the modulation level) is periodically updated at a first period and at least one of the modulation level limited interval and the protection space is periodically updated at a second period and the second period may be larger than the first period.

Further, according to the second disclosure of the present specification, the modulation level limited interval may be periodically repeated and the period or an occurrence frequency of the modulation level limited interval may be configured or selected differently for each cell.

Further, each of the cells may request other cells to change the period or occurrence frequency of the modulation level limited interval.

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 6:
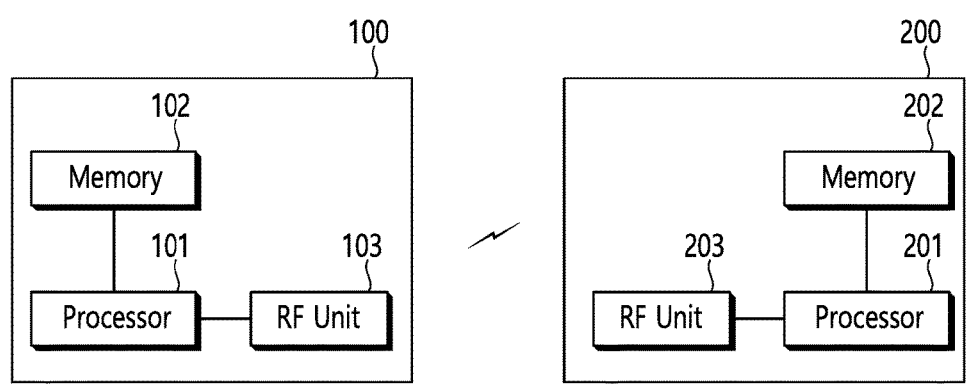
FIG. 6 is a block diagram illustrating a wireless communication system in which the disclosure of the present invention is implemented.

FIG. 6 is a Block Diagram Illustrating a Wireless Communication System in which the Disclosure of the Present Specification is Implemented.

A base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

A user equipment (UE) 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

The base station according the disclosures of the present specification as a base station that performs interference randomization for inter-cell interference control and performs link adaptation depending on application of the interference randomization may include an RF unit that acquires information on a modulation level for at least one coordination cell which becomes an interference coordination target and a processor that determines the at least one coordination cell which becomes the interference coordination target among neighbor cells and performs the link adaptation based on the information on the modulation level.

That is, the base station according to the disclosures of the present specification as a base station for performing interference randomization for inter-cell interference control and performing link adaptation by applying the interference randomization includes an RF unit acquiring interference information for at least one coordination cell to which interference coordination is to be applied among neighbor cells and a processor performing link adaptation based on the interference information and the interference information may include information on a modulation level representing a modulation scheme of the neighbor cell.

As described above, the neighbor cells may include the $1^{st}$ neighbor cell directly adjacent to the base station and the high order neighbor cell adjacent to an outer direction of the $1^{st}$ neighbor cell.

The processor configures a modulation level limited interval in which the modulation level needs to be equal to or higher than a reference modulation level and a protection space in which in which it is difficult to maintain a high SINR and modulation level limitation of the neighbor cells is thus required, and the reference modulation level may be an average modulation level or a minimum modulation level corresponding to the base station.

Further, the processor may configure the modulation level limited interval by considering the protection space corresponding to the coordination cell.

In addition, the terminal according to the disclosures of the present specification as a terminal performing communication with a base station for performing interference randomization for inter-cell interference control and performing link adaptation by applying the interference randomization includes: an RF unit acquiring a cell list for at least one coordination cell to which interference coordination is to be applied among neighbor cells from the base station; and a processor measuring signal reception power for a downlink signal transmitted by each of cells included in the cell list and reporting a measurement result for the signal reception power to the base station, and the base station may perform link adaptation on the basis of the measurement result.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

As described above, according to the disclosure of the present specification, the problem in the related art is solved. In more detail, according to the disclosure of the present specification, when the interference randomization technique is applied in order to control inter-cell interference, link adaptation is performed based on interference information such as a modulation level for an adjacent cell which becomes an interference control target, and as a result, a received SINR increases again and the interference randomization technique is optimized and efficient link adaptation is performed.

Further, in the method for performing link adaptation according to the disclosure of the present specification, when an inter-cell interference randomization technique is used for the inter-cell interference control, a received SINR increases and inter-cell semi-persistent signaling is reinforced and a related process is defined so as to enable stable and more efficient link adaptation by considering characteristics of the interference randomization technique.

What is claimed is:

1. A method for performing interference randomization for inter-cell interference control and link adaptation by a serving cell, the method comprising:
   determining at least one coordination cell, to which interference coordination is to be applied, among neighbor cells,
   wherein the neighbor cells include a 1st neighbor cell directly neighboring the serving cell and a 2nd neighbor cell directly neighboring the 1st neighbor cell;
   receiving a cell list of the neighbor cells from the 1st neighbor cell;
   generating a cell list of the at least one coordination cell, based on the cell list of the neighbor cells;
   acquiring information related to a modulation level representing a modulation scheme of the at least one coordination cell, based on the cell list of the at least one coordination cell, from the 1st neighbor cell; and
   performing the link adaptation based on the information related to the modulation level,
   wherein the information related to the modulation level includes information related to at least one of an average modulation level and a minimum modulation level for each of the at least one coordination cell.

2. The method of claim 1, wherein the generating of the cell list of the at least one coordination cell includes:
   requesting the cell list of each of the neighbor cells to the 1st neighbor cell,
   receiving the cell list of the neighbor cells, including a cell list of each of the 1st neighbor cell and a cell list of the 2nd neighbor cell, from the 1st neighbor cell, and
   generating the cell list of the at least one coordination cell based on a cell list of the 1st neighbor cell and a cell list of the 2nd neighbor cell.

3. The method of claim 1, further comprising:
   receiving, by the serving cell, information related to a downlink traffic load of the at least one coordination cell and information related to signal reception power of a downlink signal of the at least one coordination cell from the 1st neighbor cell,
   wherein the link adaptation is performed based on the estimated SINR gain, the information related to the modulation level limited interval of the each of the at least one coordination cell, the information related to the traffic load, and the information related to the signal reception power.

4. The method of claim 3,
   wherein the downlink signal is a reference signal, transmitted by the neighbor cell, including: the information related to the signal reception power including a measurement result for the signal reception power of the reference signal, and
   wherein the receiving of the information on the signal reception power includes: transmitting information related to at least one of a location of a resource element related to the reference signal, a reference-signal sequence, and a transmission period of the reference signal to an active user equipment (UE) served by the serving cell; and
   receiving a report of the measurement result for the signal reception power of the reference signal from the active UE.

5. The method of claim 4, wherein the active UE skips the report of the measurement result of the reference signal of a specific cell or reports that an influence of interference is small to the serving cell, when it is determined that it is impossible to measure the signal reception power for the reference signal of the specific cell among the at least one coordination cell or the influence of the interference by the specific cell is small.

6. The method of claim 1,
   wherein the serving cell configures a modulation level limited interval of the serving cell, in which the modulation level for downlink transmission of the serving cell is limited to be equal to or higher than the reference modulation level, and
   the reference modulation level is the average modulation level or the minimum modulation level related to the serving cell and the each of the at least one coordination cell.

7. The method of claim 1,
   wherein the information related to the modulation level is periodically updated based on a first period,
   wherein at least one of the modulation level limited interval of the serving cell, the modulation level limited interval of the each of the at least one coordination cell, and the protection space of the serving cell is periodically updated based on a second period, and
   wherein the second period is larger than the first period.

8. A base station (BS) for performing interference randomization for inter-cell interference control and performing link adaptation by applying the interference randomization, the BS comprising:
   a transceiver; and
   a processor, operatively connected to the transceiver, wherein the processor is configured to:
   determine at least one coordination cell to which the interference coordination is to be applied, among neighbor cells,
   wherein the neighbor cells include a 1st neighbor cell directly neighboring the serving cell and a 2nd neighbor cell directly neighboring the 1st neighbor cell;
   control the transceiver to receive a cell list of the neighbor cells from the 1st neighbor cell;
   generate a cell list of the at least one coordination cell, based on the cell list of the neighbor cells;
   acquire information related to a modulation level representing a modulation scheme of the at least one coordination cell, based on the cell list of the at least one coordination cell, from the 1st neighbor cell; and perform the link adaptation based on the information related to the modulation level,
wherein the information related to the modulation level includes information related to at least one of an average modulation level and a minimum modulation level for each of the at least one coordination cell.

9. The BS of claim 8,
wherein the processor is further configured to:
configure a modulation level limited interval of the BS in which the modulation level for downlink transmission of the serving cell needs to be equal to or higher than a reference modulation level,
wherein the reference modulation level is an average modulation level or a minimum modulation level related to the BS.

10. The BS of claim 8,
wherein the processor is further configured to:
configure the modulation level limited interval of the BS by considering a protection space of the at least one coordination cell configured by the at least one coordination cell.

11. A user equipment (UE) for performing communication with a serving cell, the UE comprising:
a transceiver; and
a processor, operatively connected to the transceiver, wherein the processor is configured to:
control the transceiver to receive a cell list, of at least one coordination cell to which interference coordination is to be applied among the neighbor cells, from the serving cell;
measure signal reception power for a downlink signal transmitted by each of the at least one coordination cell based on the cell list of the at least one coordination cell;
control the transceiver to report a measurement result of the measured signal reception power to the serving cell; and
when it is determined that an influence of the interference by a specific cell, which is included in the at least one coordination cell, is small based on the measured signal reception power, control the transceiver to report that the influence of the interference by the specific cell is small to the serving cell,
wherein the serving cell performs the link adaptation based on the reported measurement result, and
wherein the serving cell performs interference randomization for inter-cell interference control and performs link adaptation by applying the interference randomization.

12. The terminal of claim 11, wherein the neighbor cells include the $1^{st}$ neighbor cell directly neighboring the BS and a 2nd neighbor cell directly neighboring the $1^{st}$ neighbor cell.

13. The method of claim 1, further comprising:
transmitting information related to a protection space of the serving cell, including a resource requiring a modulation level limitation of the at least one coordinating cell, to the at least one coordination cell;
receiving information related to a modulation level limited interval of each of the at least one coordination cell, in which the modulation level for downlink transmission of the each of the at least one coordination cell is limited to be equal to or higher than a reference modulation level, from the at least one coordination cell; and
estimating a signal to interference plus noise ratio (SINR) gain based on the information related to the modulation level,
wherein the link adaptation is performed based on the estimated SINR gain and the information related to the modulation level limited interval of the each of the at least one coordination cell, and
wherein the modulation level limited interval of the each of the at least one coordination cell is configured by the each of the at least one coordination cell to include the protection space of the serving cell or a part of the protection space of the serving cell.

14. The BS of claim 8, wherein the processor is further configured to:
control the transceiver to transmit information related to a protection space of the serving cell including a resource, in which modulation level limitation of the at least one coordinating cell is required, to the at least one coordination cell;
control the transceiver to receive information related to a modulation level limited interval of each of the at least one coordination cell, in which the modulation level for downlink transmission of the each of the at least one coordination cell is limited to be equal to or higher than a reference modulation level, from the at least one coordination cell; and
estimate a signal to interference plus noise ratio (SINR) gain based on the information related to the modulation level,
wherein the link adaptation is performed based on the estimated SINR gain and the information related to the modulation level limited interval of the each of the at least one coordination cell, and
wherein the modulation level limited interval of the each of the at least one coordination cell is configured by the each of the at least one coordination cell to include the protection space of the serving cell or a part of the protection space of the serving cell.

* * * * *